US006672729B1

(12) United States Patent
Schaefer

(10) Patent No.: US 6,672,729 B1
(45) Date of Patent: Jan. 6, 2004

(54) HIGH EFFICIENCY AND PROJECTION REFLECTORS FOR LIGHT AND SOUND

(75) Inventor: Raymond B. Schaefer, Lexington, MA (US)

(73) Assignee: Phoenix Science and Technology, Inc., Chelmsford, MA (US)

( * ) Notice: Subject to any disclaimer, the term of this patent is extended or adjusted under 35 U.S.C. 154(b) by 0 days.

(21) Appl. No.: 10/125,160

(22) Filed: Apr. 18, 2002

(51) Int. Cl.[7] .................................................. G02B 5/10

(52) U.S. Cl. ........................ 359/853; 359/854; 359/850; 359/851

(58) Field of Search ................................ 359/853, 854, 359/850, 851, 856, 857, 859, 838; 362/61, 64, 80, 83, 235, 236, 241, 298

(56) References Cited

U.S. PATENT DOCUMENTS 4,755,916 A * 7/1988 Collins ........................ 362/236
4,967,730 A * 11/1990 Billheimer .................. 126/634
5,079,681 A * 1/1992 Baba et al. ................. 362/263
5,179,413 A 1/1993 Griffith
5,288,337 A * 2/1994 Mitchell ...................... 136/246
5,884,104 A * 3/1999 Chase et al. .................... 396/6
5,964,216 A 10/1999 Hoffschmidt et al.
6,016,406 A * 1/2000 Lungershausen ............ 396/200
6,035,850 A 3/2000 Deidewig et al.
6,051,775 A * 4/2000 Brown et al. ............... 136/245
6,155,694 A * 12/2000 Lyons et al. ................ 362/228

* cited by examiner

*Primary Examiner*—Mohammad Sikder
(74) *Attorney, Agent, or Firm*—Cesari and McKenna, LLP; Edwin H. Paul, Esq.

(57) ABSTRACT

A reflector employs shapes that transfer light and sound emission from sources to planes or volumes in an efficient and controlled manner. Reflector troughs employ shaped ends that increase the efficiency of utilizing output from sources, improve uniformity and project light outside the footprint of the reflector. A slanted trough reflector projects light out one or both ends of the trough outside the footprint of the reflector. Axi-symmetric and linear-symmetric reflectors provide directionality for specific applications. Sources that erode are enclosed by shaped reflectors to maintain directionality as the source erodes.

22 Claims, 7 Drawing Sheets

HIGH EFFICIENCY AND PROJECTION REFLECTORS FOR LIGHT AND SOUND

STATEMENT REGARDING FEDERALLY SPONSORED RESEARCH OR DEVELOPMENT

The present application was developed at least in part under the following government contracts: Navy contract number N00024-00-C4111, and Air Force contract number F09650-98-M-1017. The United States Government may have rights in this application.

BACKGROUND OF THE INVENTION

1. Field of the Invention

The present invention relates to reflectors to direct and/or project light and sound emission from a source.

2. Background of the Invention

A variety of emission reflectors are known in the art. For example, fluorescent bulbs have reflectors for illumination that are common in the home. Headlamps of automobiles have parabolic and other shaped reflectors for directing light. Elliptical troughs are used to reimage flashlamps to produce high intensity light for treating and removing coatings.

Accordingly there are many patents disclosing trough reflectors, for example, U.S. patent to Hoffschmidt et al. entitled, Trough-type Parabolic Concentrator, and U.S. Pat. No. 6,035,850 to Deidewig, entitled Concentrator of Focusing Solar Radiation.

Many commercial lamp systems use standard reflector troughs to deliver light. For example, to strip paint, a flashlamp is placed at one focus of an elliptical trough and the painted surface at the other focus, with flat reflectors at the ends of the trough. This type of trough reflector produces an uneven light distribution along the painted surface beneath the length of the lamp. Especially there is a lower intensity at the ends of the illuminated painted surface. This is a disadvantage because, for instance, in order to produce the intensity needed at the ends, the intensity at the center of the illuminated painted surface must be higher than necessary.

A second disadvantage arises because the flat ends of the elliptical trough reflectors both trap a significant fraction of the light between the flat ends and scatters the remaining incident light, with only a small fraction contributing to the high intensity area where paint is being stripped.

Furthermore, known elliptical trough reflectors cannot irradiate painted surfaces near walls and corners. Known practical implementations result in a light footprint on the work surface that is well inside the projected footprint of the reflector onto the work surface. In typical applications light from the reflector cannot be used to strip paint from 10% of the surface area.

Impulsive acoustic sources generally are inherently omnidirectional. However, in some uses there is a requirement for impulsive sound output to be provided in specific directions. Also, in some cases in which reflectors known-in-the-art are used with impulsive acoustic sources, some emission sources erode during operation so that a source initially at a focus of a reflector erodes away from the focus diminishing its effectiveness. In those cases it would be advantageous to have a reflector which maintained effectiveness even as the source erodes.

It is an object of the present invention: to have reflectors that would reach all the surface area; to have a reflector that both utilizes the light more efficiently and distributes the light more uniformly along work surfaces beneath the lamp.

It is another object of the invention to have end reflectors that both do not trap light and that reflect a large fraction of incident light to the high intensity work surface, for example where paint is being stripped.

It is yet another object of the present invention to have reflectors that redirect impulsive acoustic emission in specific directions.

It is still another object of the present invention to have reflectors that maintain the effectiveness even as electrodes erode.

SUMMARY OF THE INVENTION

The present invention addresses foregoing and other objects and provides other advantages by arranging reflector shapes around emissive sources.

The efficacy of light and sound sources depends in part on how the emission from the source is transferred for the intended use. In many applications a reflector is used to direct emitted light or sound onto surfaces or into volumes for processing. The present inventive reflectors can be used to improve the useful output or the efficiency of a source emission. The inventive improvement increases the capability of the source and/or reduces the requirements on the emissive source to accomplish an intended objective.

As discussed before, in general, tubular sources employ reflector troughs with flat end reflectors. In a preferred embodiment of the invention, the flat end reflectors are angled and shaped to direct better the emissions onto the work surface or into the work volume. In applications in which the objective is achieving high intensity on a surface, ellipsoidal end reflectors can both increase the efficiency of transferring light to the surface as well as produce an intensity distribution that is uniform along the axis of the trough. In applications in which the objective is to irradiate a volume, various trough and end shapes may be employed to direct better the emissions, including but not limited to angle flat and parabolic shapes.

In another preferred embodiment of the invention the trough is tapered, so that the top of the reflector is angled with respect to the surface while the foci are maintained. This projects emission outside of the footprint, so that, for instance, an entire surface area can be processed. Another preferred embodiment provides both shaped reflector ends and an angles top of the reflector, taking advantage of both inventive concepts just described.

Also, for some applications, emission is desired that is omni-directional in only one plane (e.g. horizontal), with emission extending above and below that plane up to some angle. Emission is not desired at larger angles and in the other plane (e.g. vertical). One aspect of the invention is to redirect emission into the desired direction. These applications are addressed in yet another preferred embodiment of a reflector that is axi-symmetric or linearsymmetric.

As mentioned above, some emission sources erode during operation. A preferred embodiment provides a reflector trough with shaped ends that maintains the position of the source at the focus as the source erodes.

Accordingly, the invention provides reflective means of efficiently controlling the utilization of light and sound source emission, including angled and shaped end reflectors for troughs, slanted troughs, axi- and linearsymmetric reflectors, and troughs for use with point sources. These shapes include but are not limited to partial ellipsoids, paraboloid, rounded, flat, segmented flat, and hyperbolic and other such geometric shapes and combinations of shapes.

These inventive reflectors are amenable for use in a wide variety of industrial, commercial, military, academic, and environmental applications such as surface treatment (e.g. paint stripping and UV curing), sterilization, geophysical exploration, antibiofouling, lithotripsy, underwater surveillance, sonobuoys, shallow water characterization, mine sweeping, submarine countermeasures, disinfection, destruction of organic compounds, for instance, in industrial waste, groundwater and water supplies, and the like.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope is and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
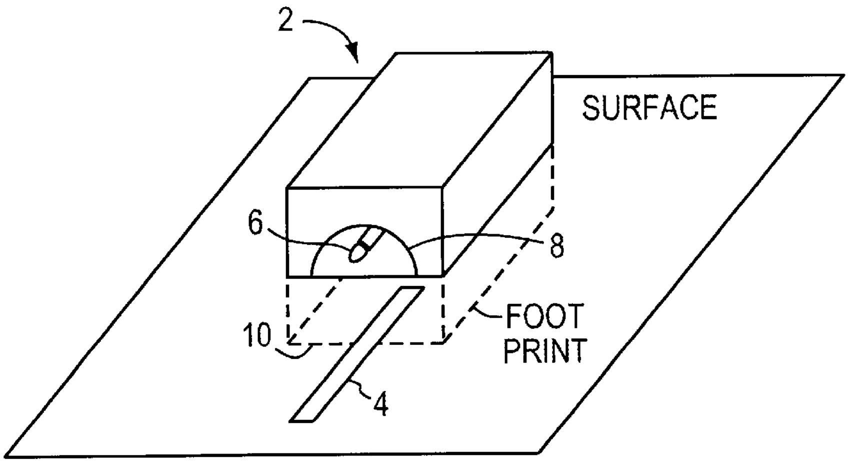
FIG. 1 is a schematic view of a reflector lamp system for surface irradiation.

Shown in FIG. 1 is a reflector-lamp system 2 for use in irradiating a surface 4 with high intensity light. A cylindrical lamp 6 is located at one focus of an elliptical trough reflector 8, and the surface 4 to be irradiated is located in the plane of the other focus of the reflector 8. As shown in FIG. 1, the elliptical trough is slanted with respect to the surface 4 so that the high intensity region is projected 10 along the general axis of the trough, out from underneath the projected footprint 12 of the reflector-lamp system.

With respect to the "projected footprint" mentioned just above and as shown in FIG. 1, "footprint" is defined herein as an outline of a normal projection of the outline of the reflector lamp system onto a flat surface normal to the projection and distant from the reflector, wherein the footprint outline is the same size as the outline of the reflector lamp system.

Figure 2A:
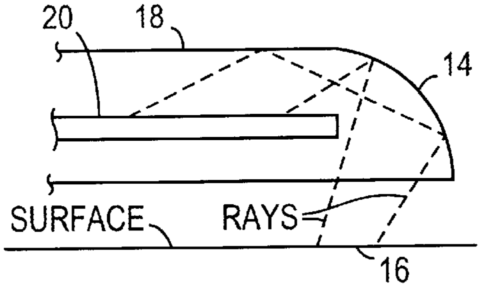
FIGS. 2A, 2B are schematic views of a reflector trough with an ellipsoidal end reflector.
Figure 2B:
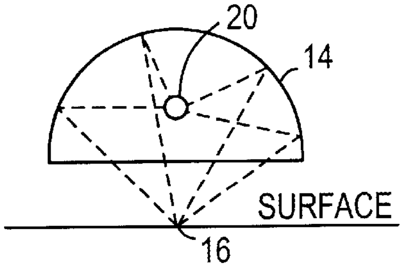

One or both of the end reflectors 14 at the end of the trough, one end shown in FIG. 2A, are shaped to reflect most of the incident light to a high intensity region 16 at the surface being irradiated. FIG. 2A shows an elliptical trough reflector 18 with a shaped end 14 with cylindrical light or sound source 20 located at the focus of the trough. In FIG. 2B, the end reflector 14 is an ellipsoid, whose curvature and orientation is chosen so that incident rays are directed to a high intensity region 16 at the second focus of the elliptical trough. This curved end reflector 14 facilitates the efficient utilization of incident rays in producing high intensity regions for various processes. The source is held in position along the focus of the elliptical trough by any of a number of standard practices known in the art.

Referring still to FIG. 2B, the optimum orientation and curvature of the ellipsoid end 14 will depend on the dimensions of the lamp, the reflector trough and the objective associated with its use. In many instances the ellipsoid end 14 dimensions are chosen so that its secondary focus 16 is located along the surface of the line defined by the trough focus. If the objective is to produce uniform intensity at the surface, the ellipsoid focus may be located near the near-end of the reflector system. If the objective is to increase intensity at the center of the reflector, the ellipsoid focus may be located near the center of the reflector system. Also, the ellipsoid focus may be located outside the footprint of the reflector so as to facilitate irradiating the surface outside the reflector footprint.

Figure 3A:
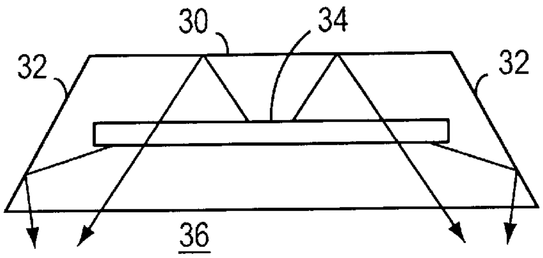
FIGS. 3A, 3B are schematic views of a reflector trough with slanted end reflectors.
Figure 3B:
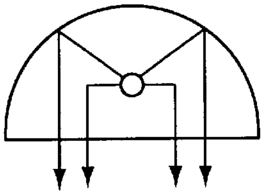

Referring to FIG. 3A, another embodiment of a shaped end reflector utilizes a parabolic trough 30 with slanted ends 32. A cylindrical light or sound source 34 is located at the focus of the parabolic trough. Such an arrangement may be advantageous for irradiating volumes (e.g. as in water treatment). The slanted end reflectors in FIGS. 3A and 3B direct emission rays into the volume 36. The end reflectors are slanted flats 32, which represent a simple and low cost means for improving the efficiency of transferring light and sound energy from a source into the volume 36. In yet other embodiments, the end reflectors 32 could take on number of other shapes (e.g. parabolic, asymmetric, polyhedral, etc.) to accomplish similar or other emission objectives.

Figure 4A:
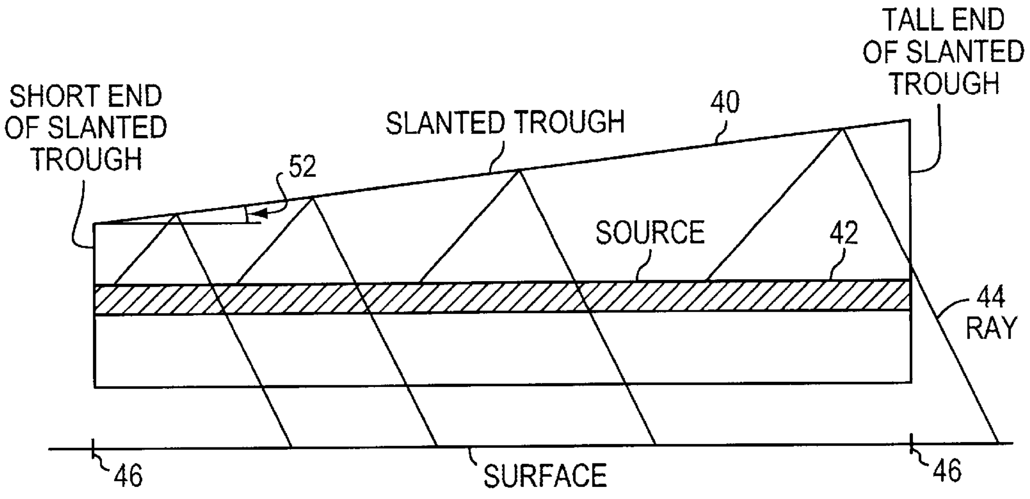
FIGS. 4A, 4B re schematic views of a slanted trough projection reflector.
Figure 4B:
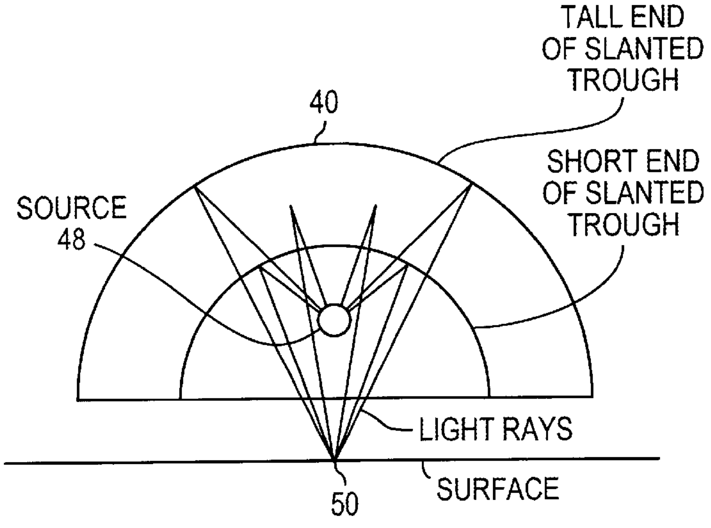

Illustrated in FIGS. 4A and 4B are another preferred embodiment which utilizes a slanted trough 40, with a cylindrical light or sound source 42. The slant operates to project or direct emissions 44 from the source sideways beyond the ends 46 footprint projection of the reflector itself. In FIG. 4B, the trough 40 cross section is an ellipse with a focus 48 where the emission source is placed and second focus 50 where the emissions are focused. The trough 40 is arranged with the major and minor axes of the ellipse increasing (from left to right in FIG. 4A) so that the top of the reflector is slanted at an angle 52. This slant projects the image of the source to the right in FIG. 4A to a position determined by the shift in position of a ray leaving the source when reflected from the top of the reflector. The location of the image is determined by the combined geometry of the source, foci and angle 52. This allows the emission from the source to reach out beyond the footprint of the reflector which, for instance, increases surface coverage and provides a means for irradiating surface areas along walls and into corners on one side of the reflector.

Figure 5A:
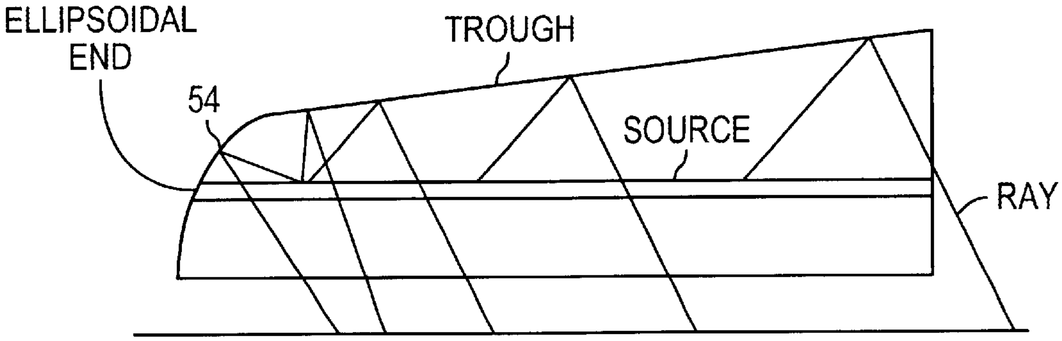
FIGS. 5A, 5B, 5C are schematic views of a slanted trough projection reflector with shaped end reflectors.
Figure 5B:
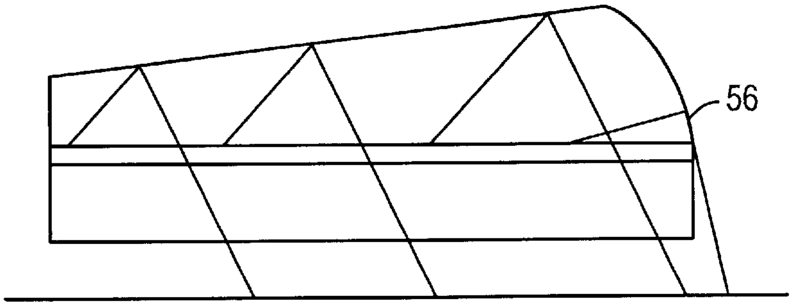
Figure 5C:
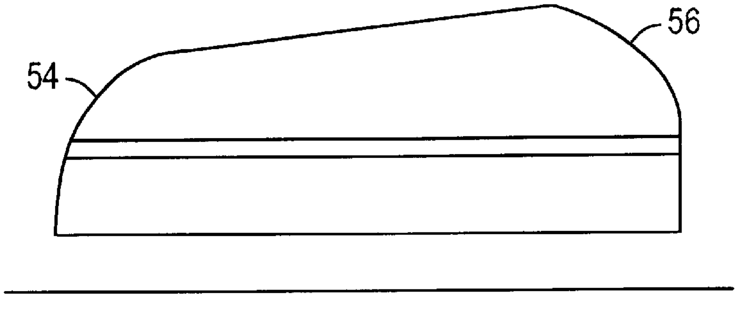

Although the slant of the trough shown in FIG. 4A is linear, another embodiment includes multiple shapes (e.g. quadratic, multiple angle linear, hybrid, etc.) that might be employed to accomplish similar effects. Other embodiments, shown in FIGS. 5A, 5B, and 5C combine shaped end reflectors with slanted troughs. These examples employ ellipsoid end reflectors on either or both of the short 54 and tall 56 ends of the slanted trough. The combination of shaped end reflector and slanted trough provide a means to improve the efficiency of the source emissions while directing the emissions. Any combination of the curved end and slanted trough embodiments discussed above are intended to be included in the invention.

Figure 6A:
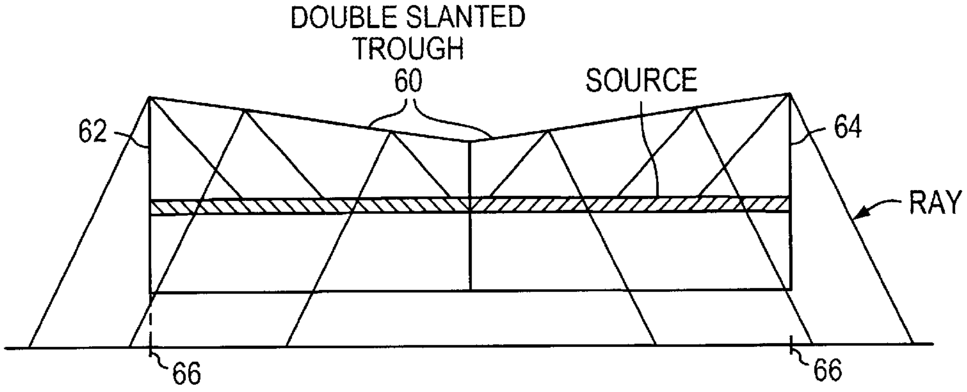
FIGS. 6A, 6B are schematic views of a double slanted trough reflector.
Figure 6B:
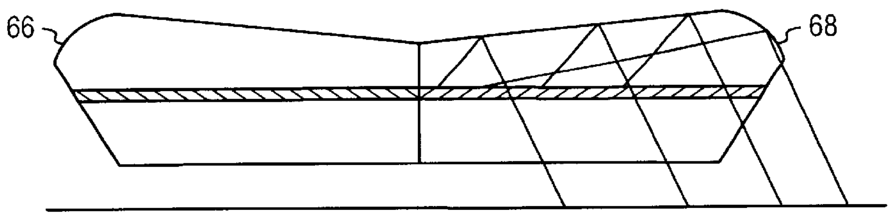

Shown in FIG. 6A is an embodiment using a double slanted trough 60 to project emissions out both ends 62 and 64 of the reflector. In this example the emissions reach out beyond the ends 66 of the reflector footprint to increase surface coverage and provide a means for irradiating surface areas along walls and into corners on both sides of the reflector. FIG. 6B is the reflector of FIG. 6A but one with curved end reflectors 66 and 68. Other preferred embodiments include any combinations of standard, slanted flat and curved end reflectors, as well as all the slanted trough shapes discussed above.

Figure 7A:
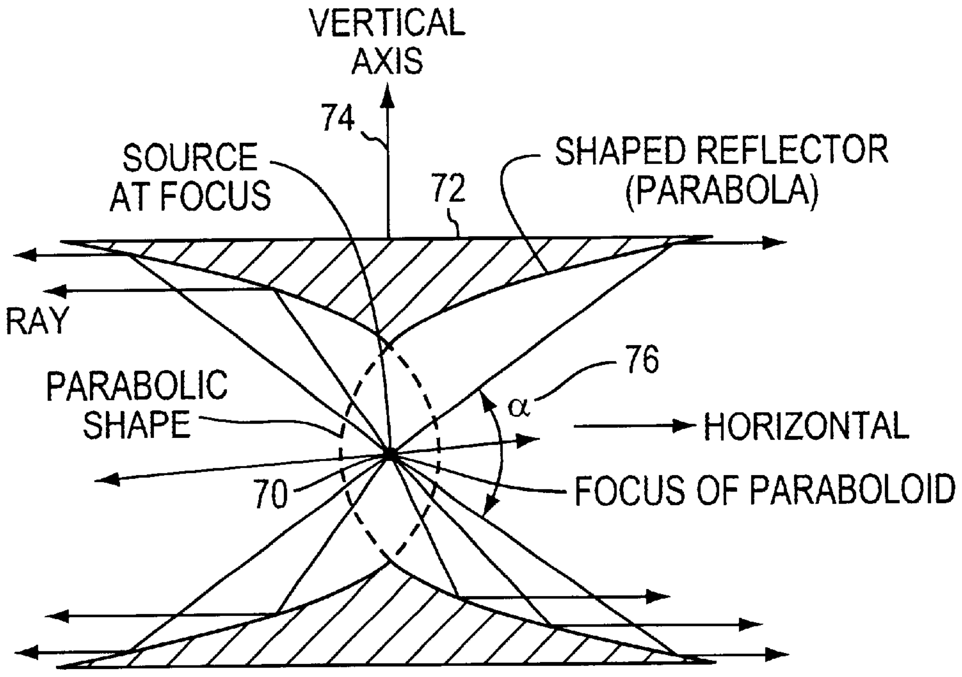
FIGS. 7A, 7B are schematic views of a semi-omnidirectional axi-symmetric reflector.
Figure 7B:
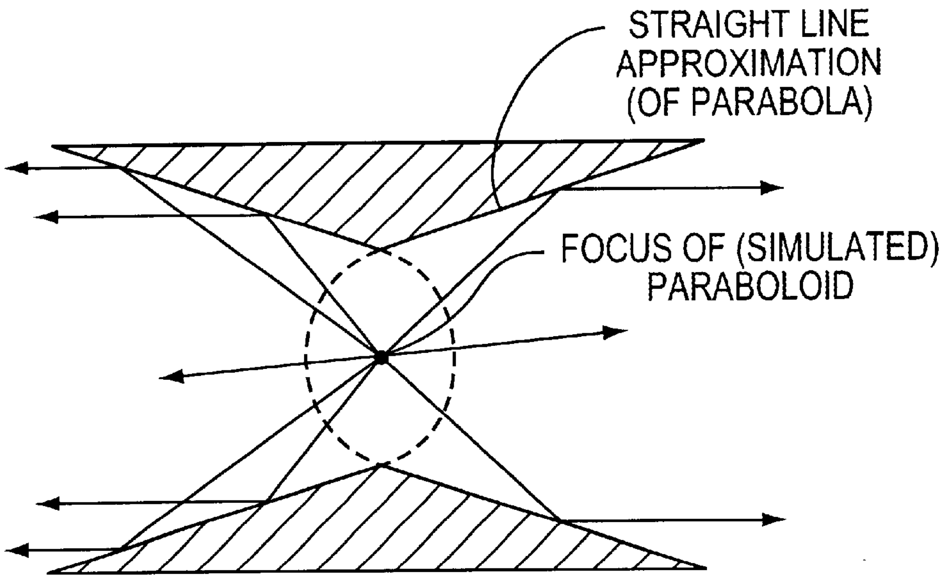

FIG. 7A illustrates another preferred embodiment reflector system for efficiently directing and projecting the emission from a sound or light source. In this embodiment a small source 70 (acting in the manner of a point source), is located at the focus of a paraboloid 72 that is symmetric about the vertical axis 74 shown. Light or sound from the source is emitted omni-directionally that is in all physical directions. The reflector redirects emissions from the source so that rays emanate from the reflector with an angle 76 to a horizontal plane normal to the vertical axis. In this instance the rays are projected outward from the focus 70 around the full 360 degrees of the horizontal plane, i.e., that is omni-directional in the horizontal plane with emission extending above and below the horizontal plane by the angle 76. In another embodiment where the output is not desired to be omni-directional in the horizontal plane, the parabolic shape may be extended to provide the desired directionality. In yet other preferred embodiments alternative shapes are used to provide other desired directionality in the horizontal plane. For example, in FIG. 7B, a straight reflector surface approximates the parabola. This is a simpler implementation than the parabola that may be sufficient for many uses. Other alternative shapes to the parabolic and straight surfaces, shown in FIGS. 7A and 7B, of the reflector are used to provide directionality, including but not limited to segmented, elliptical, asymmetric and the like.

Figure 8A:
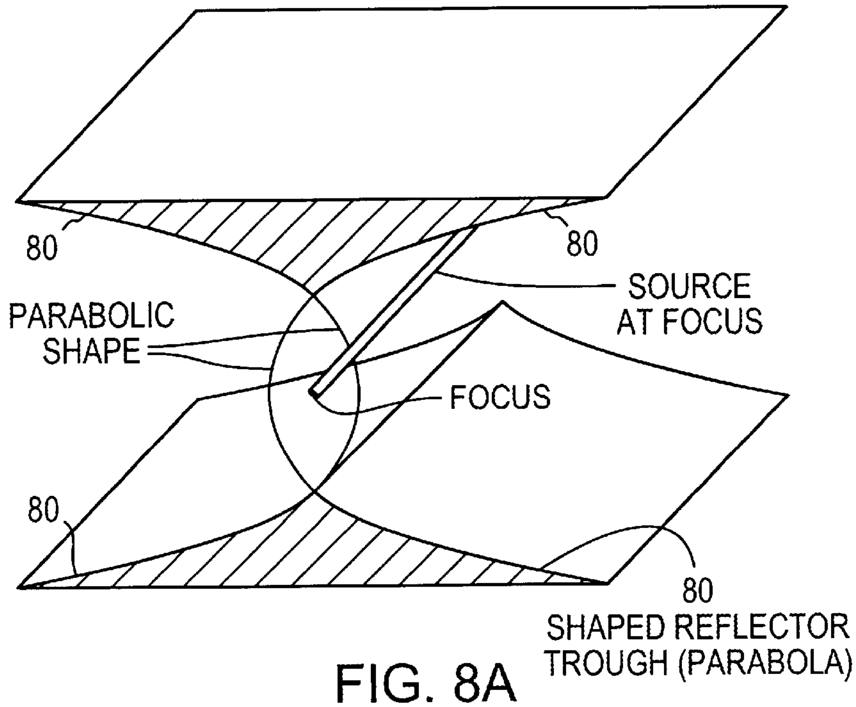
FIGS. 8A, 8B are schematic views of a semi-omnidirectional linear-symmetric reflector.
Figure 8B:
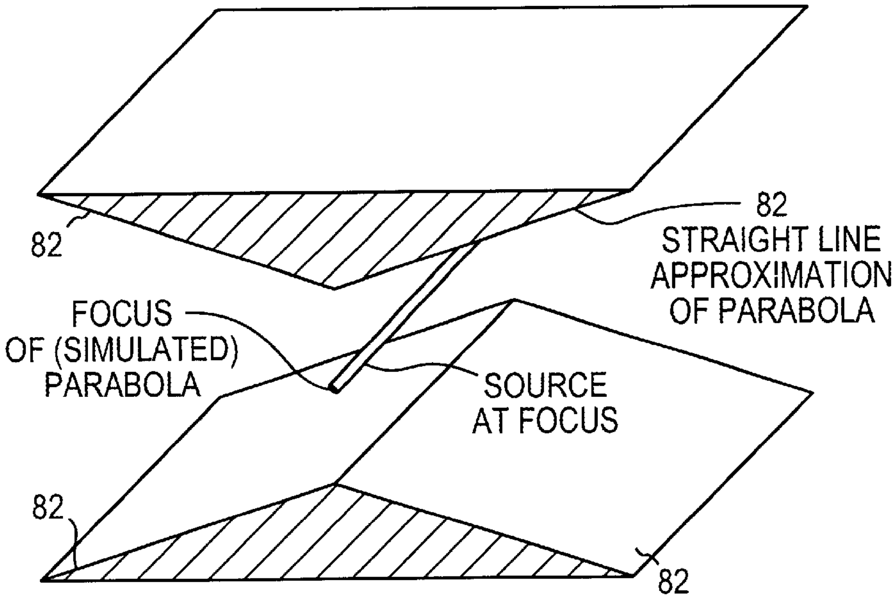

Another preferred embodiment, shown in FIG. 8A, shows a linear-symmetric geometry in which the reflector is a trough. FIG. 8A shows a linear-parabolic shaped reflector 80 and FIG. 8B a linear-straight reflector 82 shape. The same discussion regarding alternative shapes above for FIGS. 7A and 7B apply to the reflectors of FIGS. 8A and 8B.

Figure 9A:
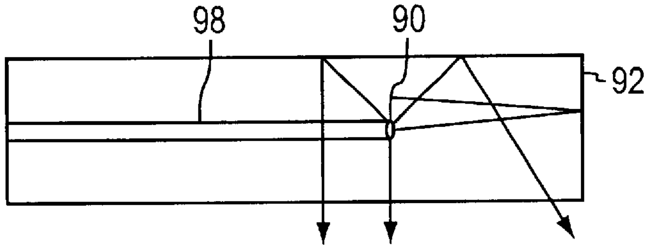
FIGS. 9A, 9B, 9C, 9D are schematic views of point sources in reflector troughs.
Figure 9B:
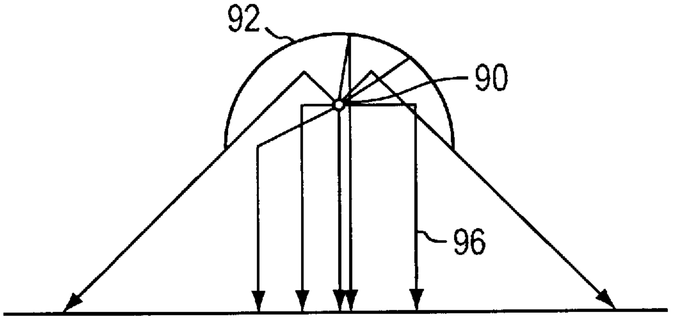
Figure 9C:
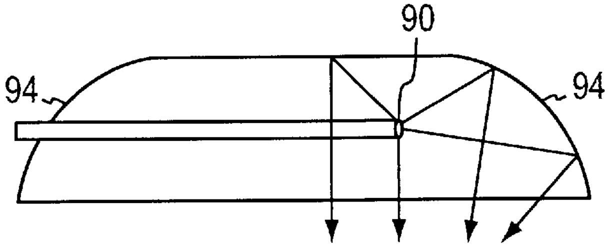
Figure 9D:
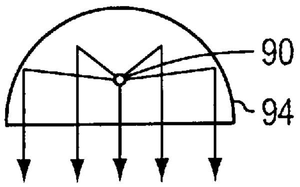

Still other preferred embodiments are illustrated in FIGS. 9A–9D. In these examples, a small area source (i.e. acting in the manner of a point source) in a standard reflective trough 92, or any of the other troughs described herein. In the end view of FIG. 9B the spread of the emission rays 96 are shown. FIG. 9C shows the point source 90 within a trough with paraboloidal or ellipsoidal ends 94. Other preferred embodiments include troughs with other shaped ends and, although not shown, slanted troughs and semi-omnidirectional troughs.

This embodiment has utility in applications in which the point source 90 erodes over time. As shown in FIG. 9A, the erosion translates the point source along the line 90 where the source remains in the focus of the reflector.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A combined reflector and source system for directing and projecting emissions from the source to a surface or into a volume, the system comprising:

a first reflective surface defining a first geometric shape, a second reflective surface defining a second geometrical surface, wherein the reflector system defines a footprint, and wherein the first and the second reflective surfaces reflect the emissions from the source, and further wherein the relative locations of the first, the second reflective surfaces, and the source combine to control the emission distribution on the surface or within the volume outside the footprint.

2. The combined reflector and source system of claim 1 wherein the first reflective surface is a trough, and the second reflective surface is located at one end of the trough.

3. The reflective system of claim 2 wherein the at least one end reflective surface is of a shape that is selected from the group consisting of ellipsoid, paraboloid, segmented, circular, or flat.

4. The reflective system of claim 2 wherein the at least one end reflective surface is asymmetric.

5. The reflective system of claim 2 wherein the trough defines a longitudinal axis and further comprises:

a second end reflective surface arranged to receive and reflect therefrom emissions from the source.

6. The reflective system of claim 5 wherein the second end reflective surface is of a shape that is selected from the group consisting of ellipsoid, a paraboloid, segmented, circular, or flat.

7. The reflective system of claim 2 wherein the second end reflective surface is asymmetric.

8. The reflective system of claim 2 wherein the emissions are light.

9. The reflective system of claim 2 wherein the emissions are sound.

10. The reflector system of claim 1 for directing and projecting emissions from a source toward a surface wherein the first reflective surface comprises:

a trough defying a curved reflective surface and a footprint onto the surface, said trough defining two ends, at least one end defining the second reflective surface and wherein the source is placed to shine emissions onto the curved reflective surface, and the curved reflective surface is slanted with respect to the surface wherein emissions from the source are reflected outside the footprint.

11. The reflector system of claim 10 wherein a cross section at one end trough is a first parabola that defines a focus at a distance from the surface, and where a cross section a the other end of the trough is a second parabola of larger dimensions than the first parabola, but where the focus of the second parabola is at the same distance from the surface.

12. The reflector system of claim 11 wherein the transition cross-sections from the first to the second ends of the trough are continuously larger parabolas all defining a focus at the same distance from the surface.

13. The reflector system of claim 11 but with partial ellipse cross sections.

14. The reflector system of claim 11 further comprising at least one reflective end surface wherein the reflective end surface directs reflected emissions towards the surface.

15. The reflective system of claim 14 wherein the at least one reflective ends surface is shaped as a partial ellipsoid, a paraboloid, segmented, rounded, or flat.

16. The reflector system of claim 1 for directing and projecting emissions from a source toward a surface:

wherein the first reflective surface defines a first curved reflective surface and a footprint onto the surface, wherein the source is placed to shine emission onto the curved reflective surface, and wherein the trough defines a longitudinal axis and a first location from which in one direction the first curved reflective surface is slanted upward with respect to the surface wherein emissions from the source are reflected outside the footprint, and wherein the second reflective surface defines a second curved surface extending from the first reflective surface inthe opposite direction and wherein the second curved reflective surface is slanted upward with respect to the surface wherein emissions from the source are reflected outside the footprint, wherein the trough along the longitudinal axis forms a v or u shape characteristic.

17. The reflector system of claim 16 wherein a cross section at the fist location is a first parabola that defines a focus at a distance from the surface, and where cross sections at the ends of the trough define second parabolas of larger dimensions than the first parabola, but where the focus of the second parabolas are at the same distance from the surface.

18. The reflector system of claim 16 wherein the transition cross sections from the first location to the ends of the trough are continuously larger parabolas all defining a focus at the same distance from the surface.

19. The reflector system of claim 16 but with partial ellipse cross sections.

20. The reflector system of claim 16 further comprising at least one reflective end surface wherein the reflective end surface directs reflected emissions towards the surface.

21. The reflective system of claim 20 wherein the at least one reflective ends surface is shaped as a partial ellipsoid, a paraboloid, segmented, rounded or flat.

22. The reflector system of claim 1 for directing and projecting a point source emission wherein the first reflective surface defines:

a first paraboloid surface constructed along a horizontal axis, and the second reflective surface defines at least one reflective end surface of the trough, the first paraboloid surface defining a focus line, and point source located at the paraboloid focus wherein the point source remains at the paraboloid focus as the point source erodes.

* * * * *